8356 X
2 Sheets-Sheet 1.
J. Delano.
Fire-Proof Safe.
Reissued Aug. 13, 1834.
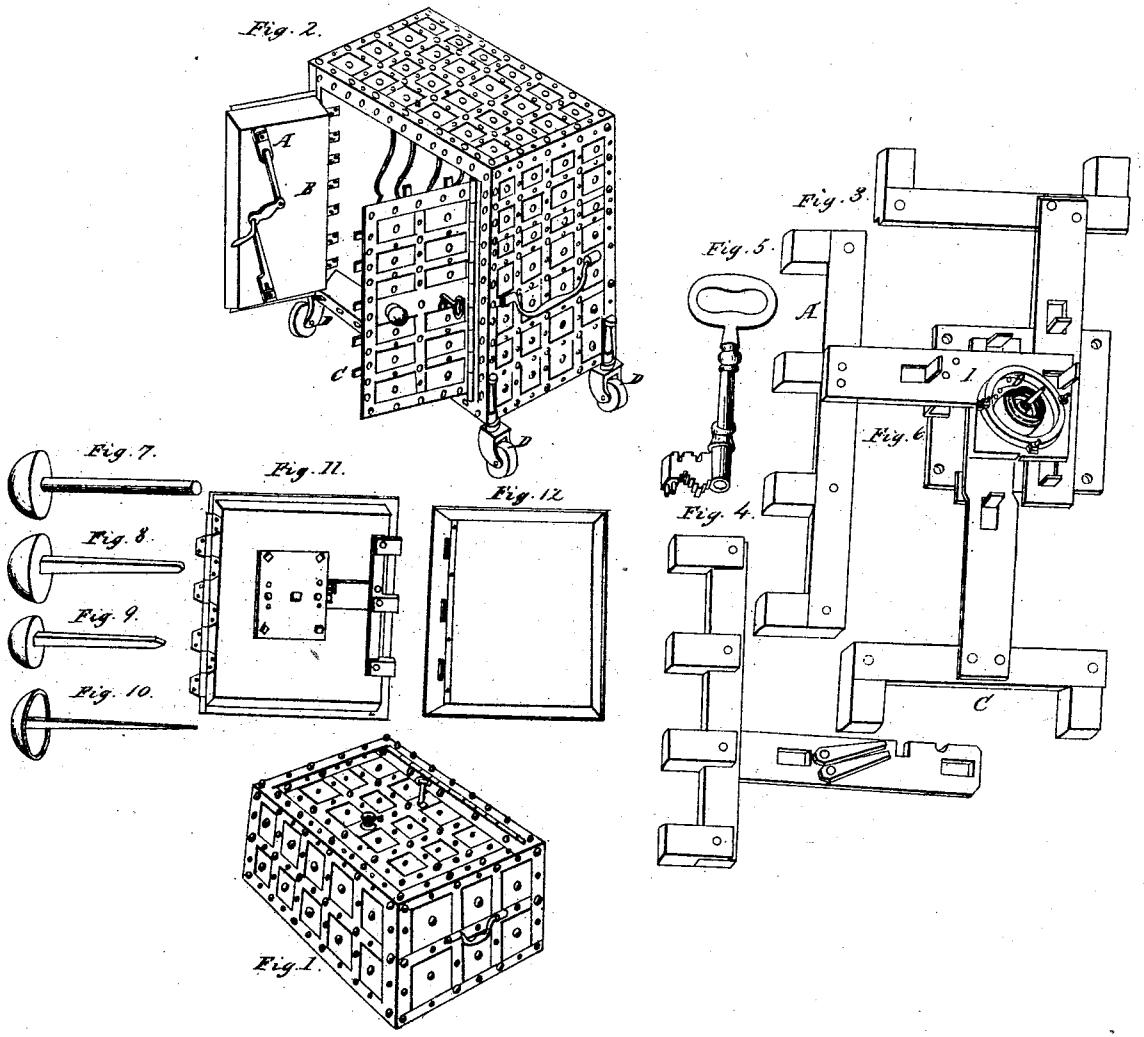

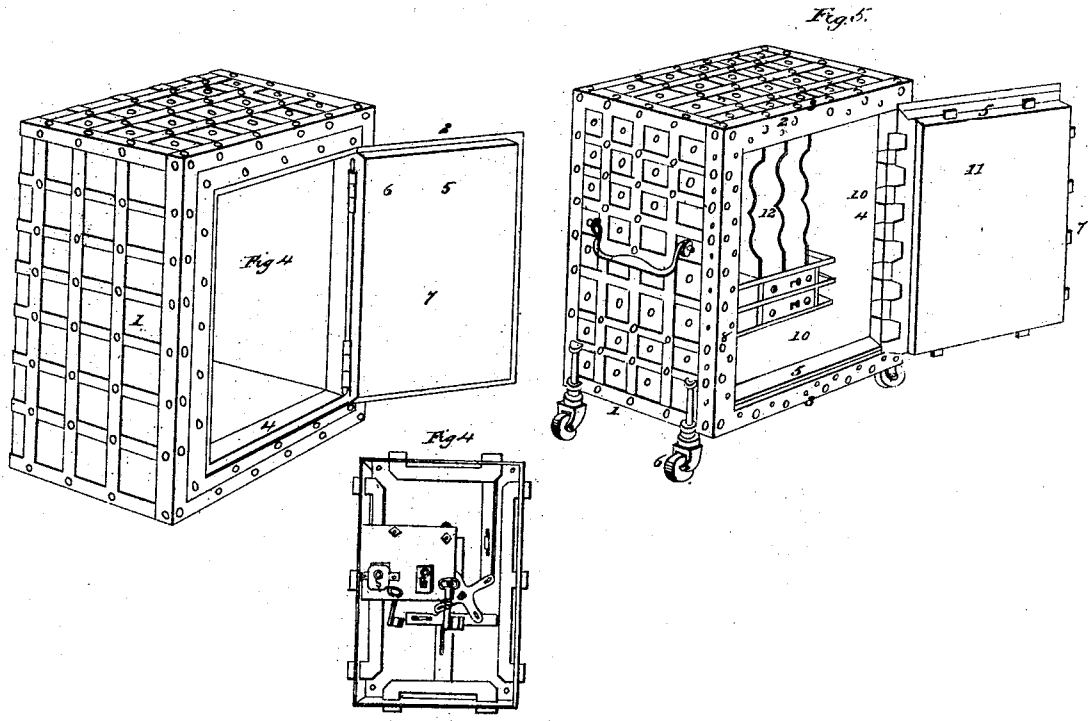

No Printed Specification Available
2 Sheets-Sheet 2.
8356X
J. Delano,
Fire-Proof Safe.
Reissued Aug. 13, 1834.